US009128973B1

(12) United States Patent
Murugesan et al.

(10) Patent No.: US 9,128,973 B1
(45) Date of Patent: Sep. 8, 2015

(54) METHOD AND SYSTEM FOR TRACKING RE-SIZING AND RE-CREATION OF VOLUMES USING MODIFICATION TIME

(75) Inventors: Sureshbabu Murugesan, Seattle, WA (US); Vaibhav Khanduja, Cupertino, CA (US)

(73) Assignee: EMC CORPORATION, Hopkinton, MA (US)

( * ) Notice: Subject to any disclaimer, the term of this patent is extended or adjusted under 35 U.S.C. 154(b) by 0 days.

(21) Appl. No.: 13/485,506

(22) Filed: May 31, 2012

Related U.S. Application Data

(63) Continuation-in-part of application No. 13/248,408, filed on Sep. 29, 2011, and a continuation-in-part of application No. 13/248,223, filed on Sep. 29, 2011.

(51) Int. Cl.
*G06F 17/30* (2006.01)

(52) U.S. Cl.
CPC ............................. *G06F 17/30368* (2013.01)

(58) Field of Classification Search
CPC .......... G06F 17/30368; G06F 11/1451; G06F 2201/84; G06F 11/1446
See application file for complete search history.

(56) References Cited

U.S. PATENT DOCUMENTS

| 5,689,706 | A | 11/1997 | Rao et al. |
| 5,913,061 | A | 6/1999 | Gupta et al. |
| 6,981,114 | B1 * | 12/2005 | Wu et al. ..................... 711/162 |
| 7,039,739 | B2 | 5/2006 | Bonola |
| 7,158,991 | B2 | 1/2007 | Kekre et al. |
| 7,383,294 | B1 | 6/2008 | Tamer et al. |
| 7,424,592 | B1 * | 9/2008 | Karr et al. ..................... 711/203 |
| 7,765,167 | B2 | 7/2010 | Prahlad et al. |
| 8,005,797 | B1 | 8/2011 | Chepel et al. |
| 8,055,613 | B1 | 11/2011 | Mu et al. |
| 8,069,149 | B1 * | 11/2011 | Chen et al. ................... 707/649 |
| 8,117,410 | B2 | 2/2012 | Lu et al. |
| 8,266,106 | B2 | 9/2012 | Prahlad et al. |
| 8,346,727 | B1 | 1/2013 | Chester et al. |
| 2002/0107877 | A1 | 8/2002 | Whiting et al. |
| 2005/0091221 | A1 | 4/2005 | Harris et al. |
| 2009/0172641 | A1 * | 7/2009 | Wong ............................ 717/122 |
| 2011/0078119 | A1 | 3/2011 | Soran et al. |
| 2011/0088027 | A1 * | 4/2011 | Jelvis et al. .................. 717/174 |
| 2011/0173160 | A1 | 7/2011 | Kryger |
| 2011/0191297 | A1 | 8/2011 | Beck |
| 2011/0202719 | A1 | 8/2011 | Rossi et al. |
| 2011/0218968 | A1 | 9/2011 | Liu et al. |
| 2011/0246731 | A1 * | 10/2011 | Ninose et al. ................. 711/162 |
| 2012/0016842 | A1 | 1/2012 | Furuya |
| 2012/0109958 | A1 * | 5/2012 | Thakur et al. ................ 707/737 |
| 2012/0233123 | A1 | 9/2012 | Shisheng et al. |

OTHER PUBLICATIONS http://leaf.dragonflybsd.org/cgi/web-man?command=fstat&section=2 System calls obtaining modification time.*

* cited by examiner

*Primary Examiner* — Dinku Gebresenbet

(74) *Attorney, Agent, or Firm* — Dergosits & Noah LLP; Todd A. Noah

(57) ABSTRACT

This disclosure relates to a method, article of manufacture, and apparatus for backing up data. In some embodiments, this includes a backup server locating one or more instances of data associated with a list of identifiers, wherein each instance of data comprises one or more target volumes and associated journal volume; the enablement of replication; and replication.

20 Claims, 9 Drawing Sheets

330

| MINOR NUMBER (332) | BITMAP (334) | RECORD ID NUMBER (336) |
|---|---|---|
| 1010 | BM1 | 1.0 |
| 1011 | BM2 | 2.0 |
| . | . | . |
| . | . | . |
| . | . | . |
| 1111 | BM6 | 6.0 |

| Minor Number (342) | Major Number (344) | Modification Time (346) | ... | Bitmap (348) |
|---|---|---|---|---|
| | | | | Length (350) |

| MINOR NUMBER (362) | BITMAP (364) | MODIFICATION TIME (366) |
|---|---|---|
| 1010 | BM1 | Sun May 20 20:36:14 2012 |
| 1011 | BM2 | Sun May 20 19:26:00 2012 |
| . | . | . |
| . | . | . |
| . | . | . |
| 1111 | BM6 | Sun May 20 21:30:10 2012 |

FIG. 3E

METHOD AND SYSTEM FOR TRACKING RE-SIZING AND RE-CREATION OF VOLUMES USING MODIFICATION TIME

CROSS-REFERENCE TO RELATED APPLICATIONS

This application is a continuation-in-part of co-pending U.S. patent application Ser. No. 13/248,408 for METHOD AND SYSTEM FOR SUPPORTING BLOCK-LEVEL INCREMENTAL BACKUPS OF FILE SYSTEM VOLUMES USING VOLUME PSEUDO DEVICES filed Sep. 29, 2011, which is incorporated herein by reference for all purposes, and U.S. patent application Ser. No. 13/248,223 for METHOD AND SYSTEM FOR TRACKING RE-SIZING AND RE-CREATION OF VOLUMES CREATED FOR MAKING INCREMENTAL BACKUPS filed Sep. 29, 2011, which is incorporated herein by reference for all purposes.

FIELD

The present invention relates generally to data systems and specifically to systems and methods of efficient data backup.

BACKGROUND

In computer storage, a volume management scheme provides a method of allocating space on mass-storage devices that is more flexible than conventional partitioning schemes. In particular, a volume manager can concatenate, stripe together or otherwise combine partitions into larger virtual units that administrators can re-size or recreate, potentially without interrupting system use. Supporting backups for a high-density file system using traditional mechanism of walking through the files and collecting information can often be very slow. Snapshot techniques, such as the Networker SnapImage Module solve this problem by taking snapshot images of the file system to perform live backups at the block level. Unlike disk-level backup systems, resizing or recreating a volume requires block-level snapshot programs like SnapImage to track and accommodate any resizing or recreation of blocks to ensure proper backup operation.

Backup applications supporting block-level incremental backup are built upon tracking writes onto volumes. The UNIX volume manager creates volume devices conforming to standards making a block and or character device for each volume it creates. Each block/character device is represented using a major and minor number. To track writes to the volume, the snapshot program creates a bitmap indexed using major and minor number of the volume device. The length of the bitmap is directly proportional to the size of volume. The change in size of volume needs to be tracked so that the bitmap can be adjusted accordingly. Volume manager programs usually provide a user interface that allows deletion and re-creation of the same volume. Administrators may re-create volumes for number of reasons, such as changing the disk layout from concatenated to striped, or vice versa. Re-creation or re-sizing of a volume may result in a new pseudo volume device with a minor number that may have been previously used. Any such repetition must be tracked and reported to the snapshot backup application so that the bitmap created for that volume can be flushed or recreated. If any repetition of the major/minor number is not tracked, the snapshot program may perform an incomplete or incorrect backup.

In present backup systems, the change in length or recreation of a volume is not tracked as the bitmap created within most snapshot programs tracks writes on the low level disk. Thus, present backup systems fail to accommodate challenges posed by resizing or recreation of volumes at the block-level. There is a need, therefore, for an improved method or system to track re-sizing and re-creation of volumes.

BRIEF DESCRIPTION OF THE DRAWINGS

The present invention will be readily understood by the following detailed description in conjunction with the accompanying drawings, wherein like reference numerals designate like structural elements, and in which:

FIG. 3C is a table that illustrates an example association of unique record ID numbers with specific bitmaps and minor numbers;

FIG. 3D is a table that illustrates a data structure containing an association of identifiers such as modification time with bitmaps and minor numbers according to some embodiments;

FIG. 3E is a table that illustrates an example association of modification time with specific bitmaps and minor numbers;

DETAILED DESCRIPTION

Figure 1:
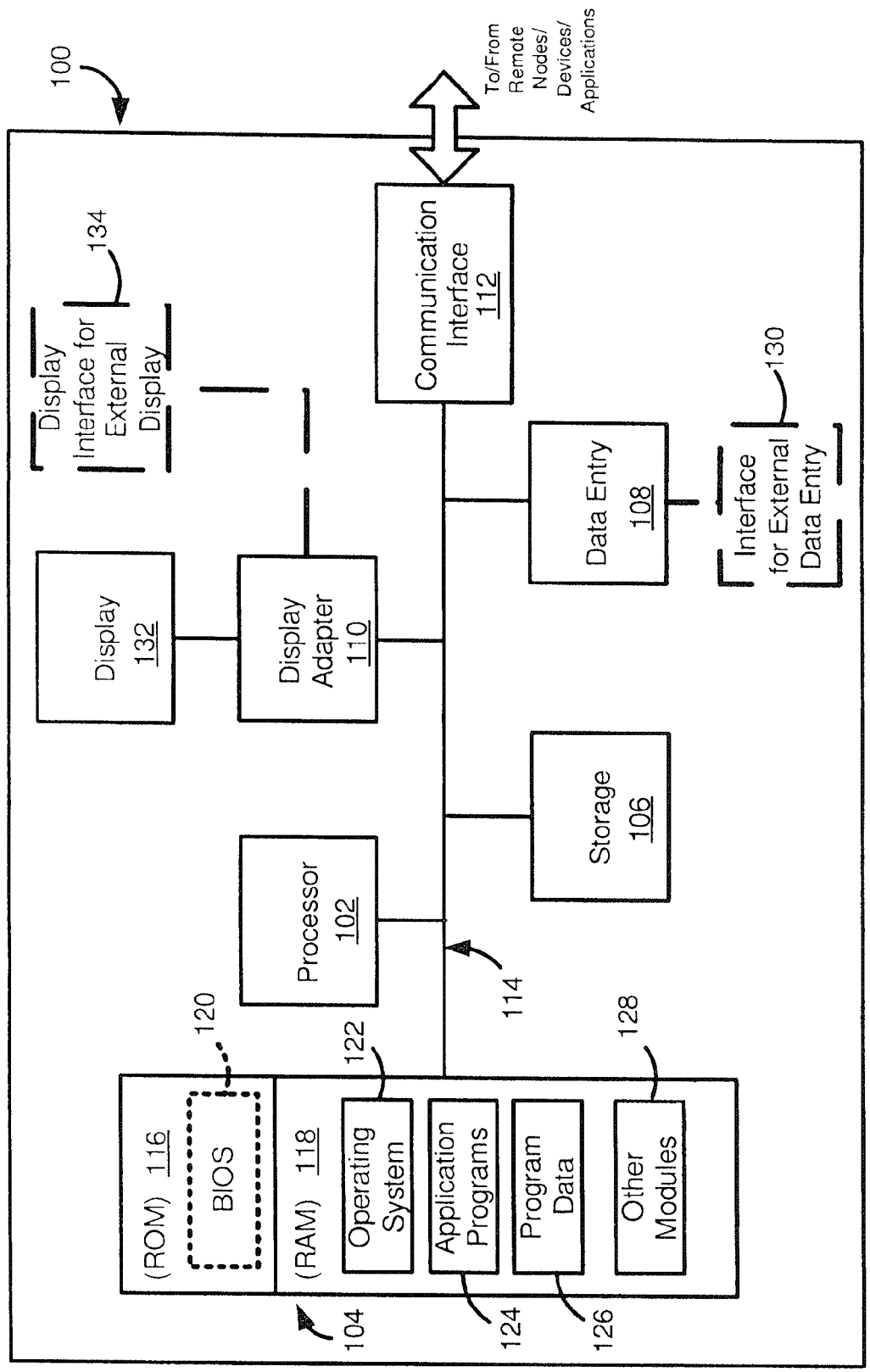
FIG. 1 is a block diagram illustrating an example hardware device in which the subject matter may be implemented.

A detailed description of one or more embodiments of the invention is provided below along with accompanying figures that illustrate the principles of the invention. While the invention is described in conjunction with such embodiment(s), it should be understood that the invention is not limited to any one embodiment. On the contrary, the scope of the invention is limited only by the claims and the invention encompasses numerous alternatives, modifications, and equivalents. For the purpose of example, numerous specific details are set forth in the following description in order to provide a thorough understanding of the present invention. These details are provided for the purpose of example, and the present invention may be practiced according to the claims without some or all of these specific details. For the purpose of clarity, technical material that is known in the technical fields related to the invention has not been described in detail so that the present invention is not unnecessarily obscured.

It should be appreciated that the present invention can be implemented in numerous ways, including as a process, an apparatus, a system, a device, a method, or a computer-readable medium such as a computer-readable storage medium containing computer-readable instructions or computer program code, or as a computer program product, comprising a computer-usable medium having a computer-readable program code embodied therein. In the context of this disclosure, a computer-usable medium or computer-readable medium may be any medium that can contain or store the program for use by or in connection with the instruction execution system, apparatus or device. For example, the computer-readable storage medium or computer-usable medium may be, but is not limited to, a random access memory (RAM), read-only memory (ROM), or a persistent store, such as a mass storage device, hard drives, CDROM, DVDROM, tape, erasable programmable read-only memory (EPROM or flash memory), or any magnetic, electromagnetic, infrared, optical, or electrical means or system, apparatus or device for storing information. Alternatively or additionally, the computer-readable storage medium or computer-usable medium may be any combination of these devices or even paper or another suitable medium upon which the program code is printed, as the program code can be electronically captured, via, for instance, optical scanning of the paper or other medium, then compiled, interpreted, or otherwise processed in a suitable manner, if necessary, and then stored in a computer memory. Applications, software programs or computer-readable instructions may be referred to as components or modules. Applications may be hardwired or hard coded in hardware or take the form of software executing on a general purpose computer or be hardwired or hard coded in hardware such that when the software is loaded into and/or executed by the computer, the computer becomes an apparatus for practicing the invention. Applications may also be downloaded, in whole or in part, through the use of a software development kit or toolkit that enables the creation and implementation of the present invention. In this specification, these implementations, or any other form that the invention may take, may be referred to as techniques. In general, the order of the steps of disclosed processes may be altered within the scope of the invention.

An embodiment of the invention will be described with reference to a data system configured to store files, but it should be understood that the principles of the invention are not limited to data systems. Rather, they are applicable to any system capable of storing and handling various types of objects, in analog, digital, or other form. Although terms such as document, file, object, etc. may be used by way of example, the principles of the invention are not limited to any particular form of representing and storing data or other information; rather, they are equally applicable to any object capable of representing information.

The subject matter presented herein provides for backups that operate at the volume layer and utilizes the pseudo device layer that exists between the file system layer and the device layer. Present backup systems perform block level backups at the disk level. This limits snapshot applications to use proprietary drivers compatible with specific volume managers due to unpublished information regarding translation between file system extents to disk extents. Embodiments of a method operate at the volume layer and utilize the pseudo device layer that exists between the file system layer and the device layer. The full pseudo disk (0-n) is backed up only upon receipt of a backup request, and not automatically performed upon startup. Incremental backups are performed thereafter using a driver that has been modified to include a monitor that tracks writes during backups. The standard I/O routine of the kernel is overwritten with an I/O routine that tracks write operations. The volume manager is called back to perform the incremental backup operations upon each write operation. The going down routine of the kernel is also overwritten to track any updates to the volume manager. If the volume manager is updated, the data structure is cleared and future backups are performed from a subsequent full backup.

In accordance with some embodiments, the volume manager that provides for backups that operate at the volume layer and utilizes the pseudo device layer, that exists between the file system layer and the device layer, may be a Veritas volume manager (VxVM). The VxVM driver defines a minor number that indexes a specific bitmap stored during a snapshot backup operation. Re-creation or re-sizing a volume can lead to re-use of a previously used minor number, thus resulting in the referencing of an incorrect bitmap or deletion of a valid bitmap. Embodiments of a snapshot program make use of a record ID number that is generated by the VxVM driver. The record ID number is used as an additional index to correlate specific minor numbers and bitmaps. During backup operations, a process checks the record ID number to ensure that a previously used minor number is not re-used to ensure that the corresponding bitmap remains uncorrupted. For non VxVM systems that do not automatically generate a record ID number, the process can include a function to create a record number, such as from a timestamp, that will form an additional index to the minor number to bitmap correlation.

Embodiments are directed to a system and method for tracking resizing and recreation of volumes in a block-based snapshot backup program. In an embodiment, a record ID is associated with a major and minor number assigned to each volume to be backed up. The record ID maintains a unique reference to the bitmap corresponding to a backed up volume in case the minor number is reused by the volume manager driver during a recreate operation. The length of the volume to be maintained is maintained and compared to the length of the bitmap to track any resizing of the volume by the volume manager. In the event of any resizing or recreation, the original bitmap can be modified or replaced with an updated bitmap to ensure proper backup of the resized or recreated volumes.

In accordance with some other embodiments, the subject matter presented herein provides for backups that operate at the volume layer and utilizes the pseudo device layer that exists between the file system layer and the device layer. The Solaris volume manager (SVM) driver may use a major number and a minor number given by UNIX operating system to index a specific bitmap stored during a snapshot backup operation. Re-sizing or recreation a volume may lead to re-use of a previously used minor number, thus resulting in the referencing of an incorrect bitmap or deletion of a valid bitmap. Incorrect bitmap may further lead to incorrect backup operations, such as taking an incremental backup instead of a full backup. Embodiments of a snapshot program make use of the last modification time associated with every file in UNIX operating system. The last modification time is used as an additional index to correlate specific major, minor numbers and bitmaps. During backup operations, a process checks the last modification time to ensure that a previously used minor number is not re-used to ensure that the corresponding bitmap remains uncorrupted.

Embodiments are directed to a system and method for tracking resizing and recreation of volumes in a block-based snapshot backup program. In some embodiments, a last modification time may be associated with a major and minor number assigned to each volume to be backed up. The last modification time maintains a cross reference to the bitmap corresponding to a backed up volume in case the minor number is reused by the volume manager driver during a recreate operation. The length of the volume to be maintained is maintained and compared to the length of the bitmap to track any resizing of the volume by the volume manager. In the event of any resizing or recreation, the original bitmap can be modified or replaced with an updated bitmap to ensure proper backup of the resized or recreated volumes.

Prior to describing the subject matter in detail, an exemplary hardware device in which the subject matter may be implemented shall first be described. Those of ordinary skill in the art will appreciate that the elements illustrated in FIG. 1 may vary depending on the system implementation. With reference to FIG. 1, an exemplary system for implementing the subject matter disclosed herein includes a hardware device 100, including a processing unit 102, memory 104, storage 106, data entry module 108, display adapter 110, communication interface 112, and a bus 114 that couples elements 104-112 to the processing unit 102.

The bus 114 may comprise any type of bus architecture. Examples include a memory bus, a peripheral bus, a local bus, etc. The processing unit 102 is an instruction execution machine, apparatus, or device and may comprise a microprocessor, a digital signal processor, a graphics processing unit, an application specific integrated circuit (ASIC), a field programmable gate array (FPGA), etc. The processing unit 102 may be configured to execute program instructions stored in memory 104 and/or storage 106 and/or received via data entry module 108.

The memory 104 may include read only memory (ROM) 116 and random access memory (RAM) 118. Memory 104 may be configured to store program instructions and data during operation of device 100. In various embodiments, memory 104 may include any of a variety of memory technologies such as static random access memory (SRAM) or dynamic RAM (DRAM), including variants such as dual data rate synchronous DRAM (DDR SDRAM), error correcting code synchronous DRAM (ECC SDRAM), or RAMBUS DRAM (RDRAM), for example. Memory 104 may also include nonvolatile memory technologies such as nonvolatile flash RAM (NVRAM) or ROM. In some embodiments, it is contemplated that memory 104 may include a combination of technologies such as the foregoing, as well as other technologies not specifically mentioned. When the subject matter is implemented in a computer system, a basic input/output system (BIOS) 120, containing the basic routines that help to transfer information between elements within the computer system, such as during start-up, is stored in ROM 116.

The storage 106 may include a flash memory data storage device for reading from and writing to flash memory, a hard disk drive for reading from and writing to a hard disk, a magnetic disk drive for reading from or writing to a removable magnetic disk, and/or an optical disk drive for reading from or writing to a removable optical disk such as a CD ROM, DVD or other optical media. The drives and their associated computer-readable media provide nonvolatile storage of computer readable instructions, data structures, program modules and other data for the hardware device 100.

It is noted that the methods described herein can be embodied in executable instructions stored in a computer readable medium for use by or in connection with an instruction execution machine, apparatus, or device, such as a computer-based or processor-containing machine, apparatus, or device. It will be appreciated by those skilled in the art that for some embodiments, other types of computer readable media may be used which can store data that is accessible by a computer, such as magnetic cassettes, flash memory cards, digital video disks, Bernoulli cartridges, RAM, ROM, and the like may also be used in the exemplary operating environment. As used here, a "computer-readable medium" can include one or more of any suitable media for storing the executable instructions of a computer program in one or more of an electronic, magnetic, optical, and electromagnetic format, such that the instruction execution machine, system, apparatus, or device can read (or fetch) the instructions from the computer readable medium and execute the instructions for carrying out the described methods. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

A number of program modules may be stored on the storage 106, ROM 116 or RAM 118, including an operating system 122, one or more applications programs 124, program data 126, and other program modules 128. A user may enter commands and information into the hardware device 100 through data entry module 108. Data entry module 108 may include mechanisms such as a keyboard, a touch screen, a pointing device, etc. Other external input devices (not shown) are connected to the hardware device 100 via external data entry interface 130. By way of example and not limitation, external input devices may include a microphone, joystick, game pad, satellite dish, scanner, or the like. In some embodiments, external input devices may include video or audio input devices such as a video camera, a still camera, etc. Data entry module 108 may be configured to receive input from one or more users of device 100 and to deliver such input to processing unit 102 and/or memory 104 via bus 114.

A display 132 is also connected to the bus 114 via display adapter 110. Display 132 may be configured to display output of device 100 to one or more users. In some embodiments, a given device such as a touch screen, for example, may function as both data entry module 108 and display 132. External display devices may also be connected to the bus 114 via external display interface 134. Other peripheral output devices, not shown, such as speakers and printers, may be connected to the hardware device 100.

The hardware device 100 may operate in a networked environment using logical connections to one or more remote nodes (not shown) via communication interface 112. The remote node may be another computer, a server, a router, a peer device or other common network node, and typically includes many or all of the elements described above relative to the hardware device 100. The communication interface 112 may interface with a wireless network and/or a wired network. Examples of wireless networks include, for example, a BLUETOOTH network, a wireless personal area network, a wireless 802.11 local area network (LAN), and/or wireless telephony network (e.g., a cellular, PCS, or GSM network). Examples of wired networks include, for example, a LAN, a fiber optic network, a wired personal area network, a telephony network, and/or a wide area network (WAN). Such networking environments are commonplace in intranets, the Internet, offices, enterprise-wide computer networks and the like. In some embodiments, communication interface 112 may include logic configured to support direct memory access (DMA) transfers between memory 104 and other devices.

In a networked environment, program modules depicted relative to the hardware device 100, or portions thereof, may be stored in a remote storage device, such as, for example, on a server. It will be appreciated that other hardware and/or software to establish a communications link between the hardware device 100 and other devices may be used.

It should be understood that the arrangement of hardware device 100 illustrated in FIG. 1 is but one possible implementation and that other arrangements are possible. It should also be understood that the various system components (and means) defined by the claims, described below, and illustrated in the various block diagrams represent logical components that are configured to perform the functionality described herein. For example, one or more of these system components (and means) can be realized, in whole or in part, by at least some of the components illustrated in the arrangement of hardware device 100. In addition, while at least one of these components are implemented at least partially as an electronic hardware component, and therefore constitutes a machine, the other components may be implemented in software, hardware, or a combination of software and hardware. More particularly, at least one component defined by the claims is implemented at least partially as an electronic hardware component, such as an instruction execution machine (e.g., a processor-based or processor-containing machine) and/or as specialized circuits or circuitry (e.g., discrete logic gates interconnected to perform a specialized function), such as those illustrated in FIG. 1. Other components may be implemented in software, hardware, or a combination of software and hardware. Moreover, some or all of these other components may be combined, some may be omitted altogether, and additional components can be added while still achieving the functionality described herein. Thus, the subject matter described herein can be embodied in many different variations, and all such variations are contemplated to be within the scope of what is claimed.

In the description that follows, the subject matter will be described with reference to acts and symbolic representations of operations that are performed by one or more devices, unless indicated otherwise. As such, it will be understood that such acts and operations, which are at times referred to as being computer-executed, include the manipulation by the processing unit of data in a structured form. This manipulation transforms the data or maintains it at locations in the memory system of the computer, which reconfigures or otherwise alters the operation of the device in a manner well understood by those skilled in the art. The data structures where data is maintained are physical locations of the memory that have particular properties defined by the format of the data. However, while the subject matter is being described in the foregoing context, it is not meant to be limiting as those of skill in the art will appreciate that various of the acts and operation described hereinafter may also be implemented in hardware.

To facilitate an understanding of the subject matter described below, many aspects are described in terms of sequences of actions. At least one of these aspects defined by the claims is performed by an electronic hardware component. For example, it will be recognized that the various actions can be performed by specialized circuits or circuitry, by program instructions being executed by one or more processors, or by a combination of both. The description herein of any sequence of actions is not intended to imply that the specific order described for performing that sequence must be followed. All methods described herein can be performed in any suitable order unless otherwise indicated herein or otherwise clearly contradicted by context.

In an embodiment, system 100 of FIG. 1 represents a Unix-based system, in which there are two general kinds of device files, known as character (char) special files and block special files. Character files relate to devices through which the system transmits data one character at a time. These device nodes often implement streaming communication with devices such as mice, keyboards, terminal, and so on. Block files correspond to devices through which the system moves data in the form of blocks. These device nodes often represent addressable devices such as memory, hard disks, CD-ROM drives, and so on, that support random access and seeking. Device nodes on Unix-based systems do not necessarily have to correspond to physical. Nodes that lack this correspondence form the group of pseudo-devices. Most file systems are based on a block device, and block storage is normally abstracted by a file system or database management system for use by applications and end users. In backup systems, block storage is typically handled by logical volume management (LVM) system.

Figure 2:
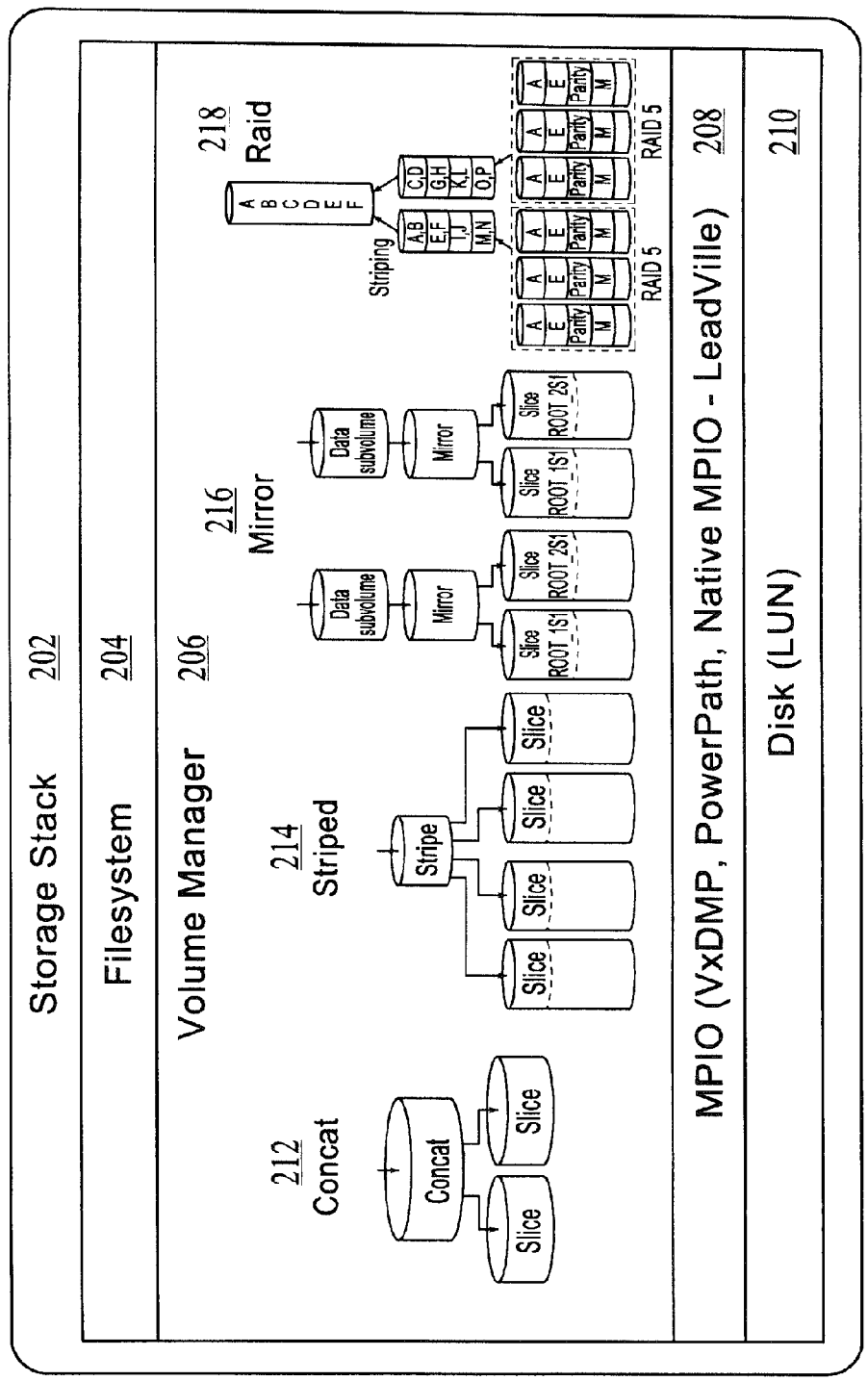
FIG. 2 is a block diagram illustrating an example storage system environment for performing pseudo-disk backups according to some embodiments.

FIG. 2 illustrates a storage stack production environment 202 that may be used with embodiments. The arrangement of components in FIG. 2 may be implemented by some or all of the components of the hardware device 100 of FIG. 1. The top-level of storage stack system 202 is the file system 204. The file system 204 serves to organize the data that is retained after a program using the data terminates. It provides procedures to store, retrieve, and update the data, and manages the available space on the storage devices that store the data. Various different file systems may be provided by different software vendors, and snapshot programs are configured to support particular file systems. For example, the SnapImage program supports VxFS (Veritas file system) and UFS (Unix file system). Below the filesystem layer 204 is the volume manager 206, which could be VxVM, HPLVM or Solaris LVM (logical volume manager). The volume manager 204 implements a form of storage virtualization. The volume manager map physical volumes or "physical extents" (e.g., hard disk partitions or logical unit numbers) of an external storage device to logical extents. These logical extents can then be manipulated in flexible ways depending on the types of disk organizations implemented in the system. For the embodiment of FIG. 2, the volume manager 206 supports concatenated (concat) 212, striped 214, mirror 216, and RAID-based 218 disk organizations.

Volume managers, such as VxVM typically provide both volume management and multi-path input/output (I/O) functionalities. Thus, as shown in FIG. 2, the volume manager layer 206 interfaces with a multipath I/O (MPIO) layer 208. The MPIO layer 208 provides a plurality of physical paths between the processor in the system and the mass storage devices through the interface components (e.g., bus, switches, etc.) to provide redundancy, fault-tolerance and enhanced performance. In an embodiment, the MPIO layer 208 of FIG. 2 may be an MPIO that is compatible with particular volume manager 206. For example, for a Veritas volume manager, the MPIO may be the Symantec Dynamic Multipathing (DMP) component, or the PowerPath™ component provided by EMC, or any other commercially available or native MPIO component. The MPIO layer 208 provides the interface to the physical storage device 210, such as a disk that is accessed through a unique LUN.

Embodiments of the volume manager component of FIG. 2 implement a snapshot backup program, such as the SnapImage program. SnapImage reduces the strain on server performance through block-level image backup. SnapImage takes a filesystem snapshot, builds a block list, and then backs up the data through the server as virtually one large file. Although embodiments may be directed to backup systems that include a SnapImage program, it should be noted that any similar snapshot program may be used, and the term "snapshot program" is intended to cover the SnapImage program or any similar volume or block-based backup program.

In general, the snapshot file system is an exact copy of the original file system as it is made at the time of the snapshot operation. A snapshot file system is read-only and exists only as long as it and the file system that has been snapped are mounted. A snapshot file system consists of a super-block, a bitmap, a blockmap, and data blocks copied from the snapped file system. The super-block is similar to the super-block of a normal VxFS file system, and is followed by a bitmap contains one bit for every block on the snapped file system. Bitmap entries are initially set to zero and a set bit in the bitmap indicates that the appropriate block was copied from the snapped file system to the snapshot. The blockmap contains one entry for each block on the snapped file system. When a block is copied from the snapped file system to the snapshot, the appropriate entry in the blockmap is changed to contain the block number on the snapshot file system that holds the data from the snapped file system. The data blocks used by the snapshot file system are filled by any data copied from the snapped file system.

After a snapshot file system is created, the bitmap, blockmap and super-block are initialized and the currently mounted file system is then frozen. The snapshot file system initially satisfies read requests by simply finding the data on the snapped file system and returning it to the requesting process. When an update or a write changes the data in a block of the snapped file system, the old data is first read and copied to the snapshot before the snapped file system is updated. The bitmap entry for that block is changed from 0 to 1 to indicate that the data for block the block can be found on the snapped file system. The blockmap entry for the block is changed to the block number on the snapshot file system containing the old data. A subsequent read request for the block on the snapshot file system is satisfied by checking the bitmap entry for the block and reading the data from the indicated block on the snapshot file system, rather than from the block on the snapped file system. As data blocks are changed on the snapped file system, the snapshot will gradually fill with data copied from the snapped file system.

Certain use cases can impose challenges on the accuracy of the snapshot file system in a block-based system. In general, a volume manager gives an option to its users with regard to multiple types of layout, i.e., concatenated, striped, mirror, and RAID, as shown in FIG. 2. The approach of taking backups from lowest level disk requires the snapshot program to parse through the disk looking for data as laid out by the volume manager. In the absence of any standards or comprehensive documentation, the approach is highly error prone, and with the addition of any further layout types, the process must be modified again. Furthermore, snapshot programs generally support recovery from disaster in which application data as well as file-system data is recovered onto the target disk. Present disaster recovery methods can only be performed on a volume that is identical in nature and structure as the original volume, and recovery between heterogeneous layouts cannot be performed. For example a backup taken from a striped volume with a particular column width cannot be recovered on a striped volume with a different column width. The complexity of this issue increases with certain high availability features implemented by volume managers, namely the relocation of devices or hot swaps, and volume manager support of relocation of devices (LUN) during application runs. The existing approach reads blocks of data from the lowest disk. In this case, a relocation executed by a volume manager during this time does not automatically fail over to the relocated device. Thus, there may be unpredictable issues resulting in data loss. Mirroring is another feature that ensures high availability. The existing solution of reading data from low-level disk cannot ensure right data backup in case of disk failover executed by volume manager. In a typical production environment, devices from backend array are exposed through more one path. Commercially available multi-pathing solutions like VxDMP, EMC PowerPath ensure high availability and load balancing for these devices. For high availability, the lowest level disk is exposed through multiple paths, and the same data can be read either through one path or through multiple paths for high performance. The approach of reading directly from disk fails the objective served by multi-pathing software. The high performance achieved with built-in features like mirroring in the volume manager or adaptive writes through multi-pathing cannot be utilized since existing solution reads data from single path of the disk.

To address these problems, a backup program supports block-level incremental backups of file system volumes using a pseudo device. That is, instead of reading from a low-level disk a driver component performs reads from the pseudo device. The pseudo device created by volume manager essentially shields its users from all the complexity it establishes in order to support the different layouts of concatenated, striped mirror, etc. The layout format of a pseudo device can be considered to be a simple disk wherein the data can be read in sequential order. Reading the data in sequential order makes the read operations simple and no mapping of the disk to a volume offset is required to be stored. This also satisfies an additional use-case of performing disaster recovery onto a volume layout that is of a completely different format than the source.

According to an embodiment, a method and system for performing disk backups simplifies the block level backups by not performing backups at disk level instead making use of pseudo block device created by volume managers. Every volume manager creates a pseudo device of the created volume. Since a file system has to reside on these devices, the volume manager not only exposes a character pseudo device but also a block pseudo device for the volume. These pseudo block and character devices exhibit the same behavior as any other SCSI disk. The backup vendors can make use of this pseudo device by reading all the blocks of the disk, assuming each block of same size. In the most practical scenario the size of each block is 512 bytes.

As stated above, a volume manager, such as the Veritas volume manager VxVM creates a pseudo disk when it creates a volume. The pseudo disk operates like a normal physical disk in that it can be mounted and read and written to. The pseudo disk does not interact directly with SCSI or other I/O drivers, however, and the volume manager does not answer back to a driver when using the pseudo disk. In an embodiment, a client-side driver used in conjunction with snapshot program is modified to enable interaction with the pseudo disk through the volume manager. This allows the snapshot backup program utilizing the driver to parse and obtain parameters (e.g., size, layout, disk geometry, etc.) for the disk. The driver is modified to hook a call back to the operating system so that it will unload itself under certain conditions. This accommodates the case of the volume manager being upgraded. The driver has also been modified to hook up the call back that comes in the I/O path of the driver, as well as hook up into the call back an indication that the driver has been unloaded. These hooks and call-back mechanisms allow the snapshot program using the driver to track writes by the volume manager, and to track upgrades of the volume manager itself. In the case of a volume manager upgrade, the data structures can be re-initialized to prevent corrupt backup operations.

Figure 3A:
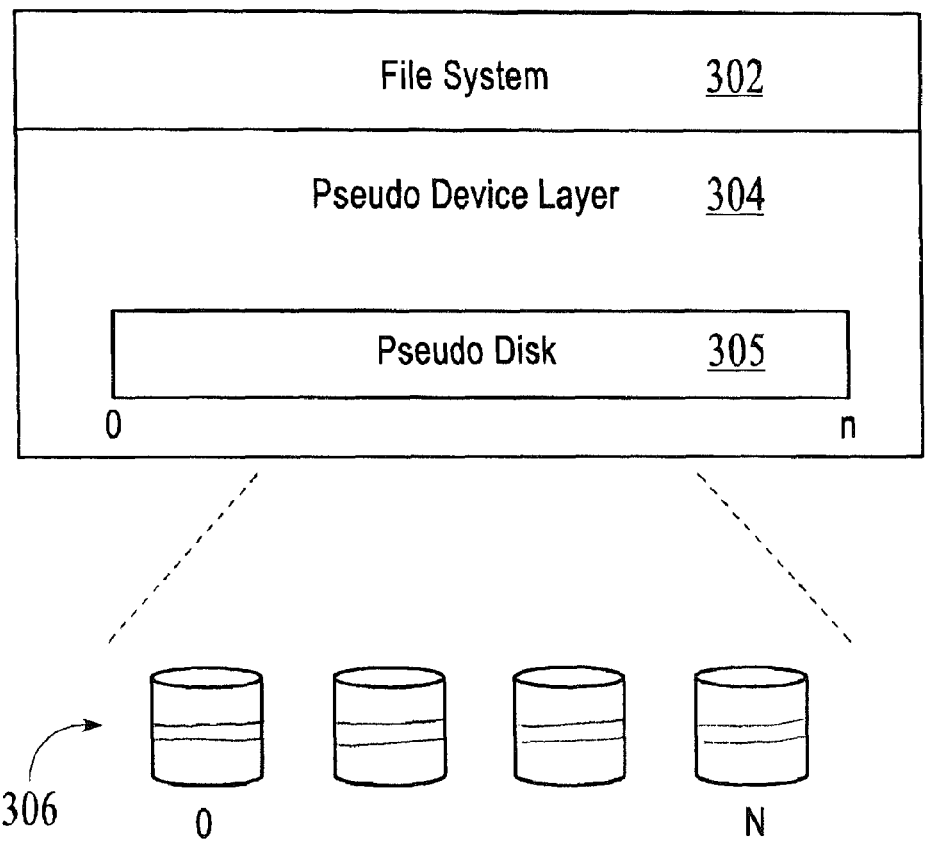
FIG. 3A illustrates the configuration of a pseudo device for performing block-level backups under an embodiment.

FIG. 3A illustrates the configuration of a pseudo device for performing block-level backups under an embodiment. As shown in FIG. 3A, a number (N) physical disks 306 are organized by a volume manager to store data in a particular format, such as a striped layout. The volume manager combines the N disks together and forms a pseudo disk layer 304. Above the pseudo disk layer 304 resides the file system 302. The file system 304 is used by the user applications. Present systems require the translation of file system extents to disk extents to perform backup operations. In an embodiment, the snapshot program works directly with the pseudo disk 305 within the pseudo disk layer 304 to take block level using the simple 0-n offset range of the pseudo disk.

Figure 3B:
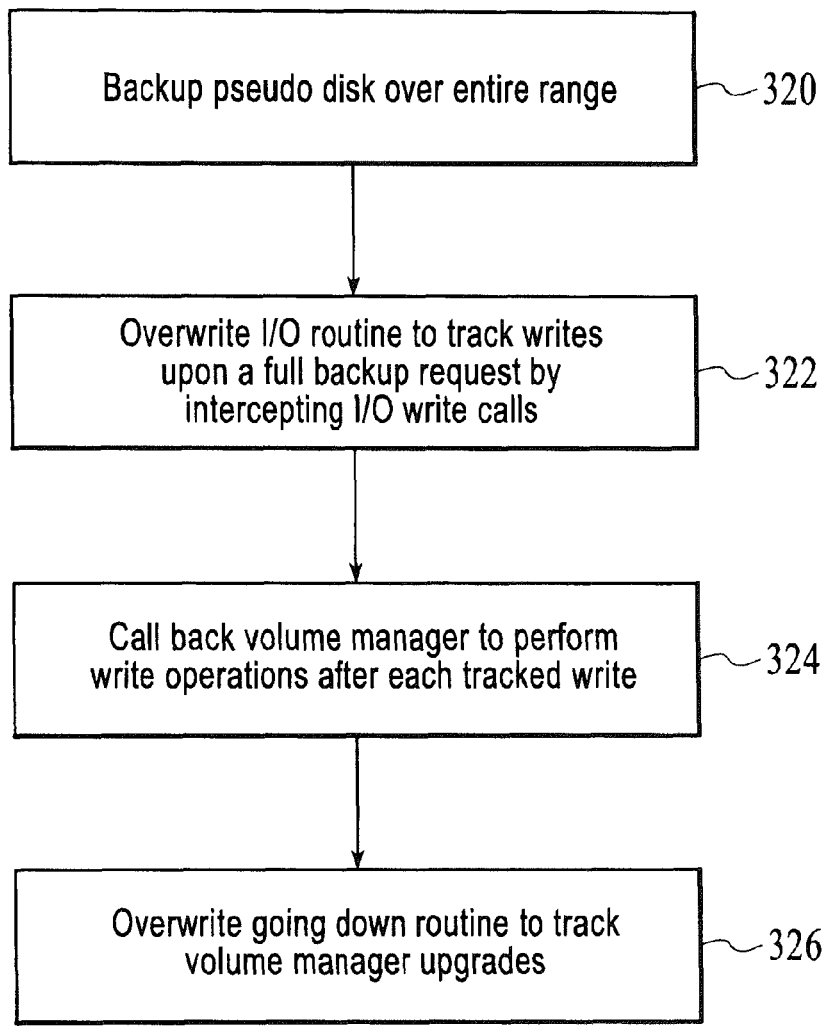
FIG. 3B is a flowchart that illustrates a method of performing block-level backups using a pseudo disk, under an embodiment.

FIG. 3B is a flowchart that illustrates a method of performing block-level backups using a pseudo disk, under an embodiment. In general, a snapshot program utilizes a driver routine that tracks write operations to the disks, as well as tracks writes during the backup operation. According to embodiments of a method, the driver for the snapshot program is configured to read the pseudo disk 305 across its entire length from 0 to n, as shown in block 320. This prevents the need to decipher or translate offsets between the disk and file extents. The driver is further configured to track write operations only upon a full backup request, block 322. It does not track writes as soon as the system boots up, but instead only after a full backup request. This prevents the issue of kernel panics associated with boot up or start up cycles. The driver overwrites the standard kernel I/O routine to track write operations. After a write request is registered, the driver calls back the volume manager to then perform the incremental backups, block 324. In certain cases, the volume manager may be upgraded, in which case any incremental backups may be corrupted due to out-of-date pointers or data structures. In this case, the driver is also configured to overwrite the "going down" or "delete" routine of the kernel to track any updates to the volume manager, block 326. If a change in the volume manager program is detected, the data structures are cleared, and the process re-initiates upon the next full backup request.

In an embodiment, certain features of Unix-based systems are exploited to allow the snapshot driver to track the I/O write operations and the volume manager updates. The Unix kernel is architecturally designed to support entry points to the devices attached to a machine. These entry points are used for reading, writing and sending control commands to the devices. The kernel provides a special entry point for the block devices known as "strategy[8]", this entry point is used for performing buffered I/O to the disk. All major file systems make use of block devices for performing I/O and thus use the "strategy" entry point of the kernel. The kernel structures expose data structures using these default entry points, which can be overwritten or stolen by the backup application driver. Stealing the strategy routine makes sure the backup application gets the I/O first before it is written to the actual device. This ensures that all the writes are intercepted by the backup application, which when tracked gives the backup application information about the blocks got changed in a particular interval of time. The pseudo devices created by volume managers also expose a block device, and implement strategy routine for these devices. In an embodiment, the snapshot backup application steals the strategy routines of the pseudo device and captures all the writes that happen on the volume through the file system. Tracking these writes enables the snapshot program to perform incremental backups, that is, backing up the changed blocks from the last full backup. Tracking the write operations at the pseudo device level (i.e., at topmost layer in the stack) gives the backup application the advantage of reading these tracked blocks directly from the pseudo disk without requiring any translation to be performed.

Certain use cases can impose challenges on the accuracy of the snapshot file system in a block-based system. For example, recreating or resizing data volumes for underlying sliced partitions may pose problems when using the underlying major/minor number structure of the Veritas volume manager. In general, the disk size cannot be changed since it is set by the system parameters (e.g., RAID size, etc.). The length of the bitmap corresponds to the length of the physical disk. The size of the volumes, however can usually be changed through appropriate graphical user interface mechanisms. Furthermore, volumes can be deleted or recreated by the user. To ensure proper operation of the snapshot program, any changes to the size of a volume (resizing), and any deletion or recreation of a volume must be tracked.

For an embodiment in which the volume manager 206 of storage stack system 202 is the Veritas volume manager VxVM, a pseudo device of the volume is created by the volume manager layer, as stated above. UNIX as an operating system mandates that each pseudo device be given a unique number called a minor device number. This minor device number is unique for a particular type of device. Each type of device is also uniquely identified by a major number. Thus, device nodes correspond to resources that the OS kernel has already allocated, and these resources are identified by a major number and a minor number. Generally, the major number identifies the device driver and the minor number identifies a particular device that the driver controls. In a VxVM system, the VxVM driver defines the minor numbers assigned to the volumes. For example, minor numbers may be assigned in the range of 0-64K and may start at any number. One issue that is associated with VxVM systems is that the minor numbers assigned to recreated, deleted, or resized volumes can be reused by the system. In this case, the bitmap associated with the original minor number by the snapshot program for an incremental backup will reference incorrect data if the minor number is reused in a subsequent snapshot.

During normal operation, the Veritas volume manager creates a pseudo device of the volume as described above. Since the file system resides on these devices, the volume manager not only exposes a character device but also a block device for the volume. For systems that perform backups at the disk-level only, the reuse of minor numbers is generally not an issue. For systems that perform backups at the volume-level, however, the reuse of minor numbers associated with recreation of volumes is an issue.

In order to overcome the issue associated with reuse of minor numbers by the VxVM driver for recreated or deleted volumes, in an embodiment, the snapshot backup system associates another unique number known as "Record ID" or "RID" with each bitmap. In an embodiment, the RID is a unique floating point number, with an integer and fractional part. The recreating of a volume may result in same minor number but it always comes with unique record ID. The snapshot program associates its internal data structures with the major number, minor number, and unique RID. FIG. 3C is a table that illustrates an example association of unique record ID numbers with specific bitmaps and minor numbers. As shown in table 330, six example bitmaps 334 denoted BM1 to BM6 are created for certain snapshot backup operations. Corresponding minor numbers 332 from 1010 to 1111 are initially assigned to each of the respective bitmaps. In addition, a unique record ID number 336 is assigned to each minor number. Thus, for the example of FIG. 3C, RID 1.0 is assigned to minor number 1010, RID 2.0 is assigned to minor number 1011, and so on. In the case that the VxVM driver reuses a particular minor number, the record ID number provides a unique identifier that preserves the assignment of the specific bitmap to the originally assigned minor number. During data access, the snapshot program checks against the RID number before accessing the bitmap for a volume for which backup is requested. In this way, the proper bitmap can be accessed even if the minor number has been reused by the VxVM driver.

In an embodiment, the record ID number 336 is a floating point number that is automatically generated by the VxVM driver upon initiation of a backup operation. The VxVM RID is then used by the snapshot system as the record ID number 336. For volume managers that do not automatically produce a record ID number (e.g., Solaris), the snapshot program driver may generate its own record ID number. In an embodiment, the record ID number is generated by a counter that generates a unique floating point number for every backup operation. Such a counter can be implemented through a time stamp component or a sequential counter, or similar component.

Along with deletion or recreation of volumes, the resizing of volumes can also cause inaccuracy of backups in volume-based systems. The VxVM driver provides an option to resize a previously created volume. The resizing of a volume may result in increasing or decreasing the size of file system residing on the volume. In an embodiment, the snapshot program provides a mechanism to track the write operations that occur on the on the changed size file system. The snapshot driver creates a bitmap for the disk and the length of the bitmap is based on the length of the volume. By discovering the length and comparing the length of the bitmap against the length of volume, the snapshot program can track the re-sizing of the volume.

As stated above, certain use cases can impose challenges on the accuracy of the snapshot file system in a block-based system. For example, recreating or resizing data volumes for underlying sliced partitions may pose problems when using the underlying major/minor number structure of the Solaris volume manager. In general, the disk size cannot be changed since it is set by the system parameters (e.g., RAID size, etc.). The length of the bitmap corresponds to the length of the physical disk. The size of the volumes, however can usually be changed through appropriate graphical user interface mechanisms. Furthermore, volumes can be deleted or recreated by the user. To ensure proper operation of the snapshot program, any changes to the size of a volume (resizing), and any deletion or recreation of a volume must be tracked.

For some embodiments, in which the volume manager 206 of storage stack system 202 is the Solaris volume manager SVM, recreating or resizing volumes for underlying sliced partitions may also pose problems when using the underlying major/minor number structure of the SVM. For example, the bitmap used by the snapshot program for backup contains a pattern indicating blocks backed up on the snapshot file system. Each bit in the bitmap corresponds to a block in a volume. Any changes to the volume may affect the accuracy of the bitmap especially when the volume structure may appear to be the same with the same major/minor number associated with the volume. Thus, to ensure proper operation of the snapshot program, any changes to a volume such as resizing, and any deletion or recreation of a volume must be tracked.

In accordance with some embodiments, in which the volume manager 206 of storage stack system 202 is the SVM, a pseudo device of the volume may be created by the volume manager layer, as stated above and illustrated in FIG. 3A and FIG. 3B. UNIX as an operating system mandates that each pseudo device be given a unique number called a minor device number. This minor device number is unique for a particular type of device. Each type of device is also uniquely identified by a major number. Thus, device nodes correspond to resources that the OS kernel has already allocated, and these resources are identified by a major number and a minor number. Generally, the major number identifies the device driver and the minor number identifies a particular device that the driver controls. In a SVM system, the SVM driver defines the minor numbers assigned to the volumes. For example, minor numbers may be assigned in the range of 0-64K and may start at any number. One issue that is associated with SVM systems is that the minor numbers assigned to recreated, deleted, or resized volumes can be reused by the system. In this case, the bitmap associated with the original minor number by the snapshot program for an incremental backup will reference incorrect data if the minor number is reused in a subsequent snapshot.

During normal operation, the SVM creates a pseudo device of the volume, as stated above. Since the file system resides on these devices, the volume manager not only exposes a character device but also a block device for the volume. For systems that perform backups at the disk-level only, the reuse of minor numbers is generally not an issue. For systems that perform backups at the volume-level, however, the reuse of minor numbers associated with recreation of volumes is an issue.

In order to overcome the issue associated with reuse of minor numbers by the SVM driver for recreated or deleted volumes, in some embodiments, the snapshot backup system may associate the modification time of the volume with each bitmap. The recreation of a volume may result in the same minor number but the modification time of the volume will be different. In some embodiments, the last modification time associated with the volume may be obtained, for example, using UNIX system command, or UNIX stat or fstat system call. It should be noted that any similar programs or tools to identify the attributes of the volume may be used to obtain the modification time.

FIG. 3D is a diagram illustrating an exemplary snapshot program internal data structure that indexes the bitmap. As shown in FIG. 3D, an exemplary snapshot program internal data structure 340 may include minor number 342, major number 344, and modification time 346 among other fields to cross reference bitmap 348. The exemplary data structure 340 may include other fields to accommodate other volume managers. For example, data structure 340 may include record ID to cross reference bitmap 348 in VxVM. Bitmap 348 may also be associated with a volume length 350. In addition, since one bitmap 348 may correspond to one volume, which may be may be a pseudo device created by a volume manager, data structure 340 may include other fields, such as a pointer to strategy among others, to associate the bitmap with the pseudo device. In the case that the SVM driver uses a particular minor number 342 after recreating a volume, the modification time 346 stored along with bitmap 348 provides a cross reference that preserves the association of bitmap 348 to the originally assigned minor number 342.

During data access, the snapshot program checks against the last modification time of a volume before accessing bitmap 348 for a volume for which backup is requested. If the last modification time of the volume is different from modification time 346 stored along with bitmap 348 in data structure 340, then further actions may be taken to determine if a re-sizing or re-creation of a volume has happened. In this way, the proper bitmap may be accessed even if the minor number has been reused by the SVM driver.

The data structure 340 illustrated in FIG. 3D may be used by SVM or similar volume managers to store a bitmap index. For some volume managers that do not use modification time 346 to cross reference bitmap 348, data structure 340 may be expanded to include other identifiers. For example, the Veritas volume manager (VxVM) may use record ID instead of modification time 346 to cross reference bitmap 348. In case a volume manager is VxVM, data structure 340 may also include a record ID field.

FIG. 3E is a table that illustrates an example association of last modification time with specific bitmaps and minor numbers in a data structure, in accordance with some embodiments. As shown in table 360, six example bitmaps 364 denoted BM1 to BM6 are created for certain snapshot backup operations. Each bitmap 364 may be associated with a volume. Corresponding minor numbers 362 from 1010 to 1111 are initially assigned to each of the respective bitmaps. In addition, the last modification time 366 may be associated with each minor number. Thus, for the example of FIG. 3E, modification time Sun May 20 20:36:14 2012 is associated with minor number 1010 and bitmap BM1, modification time Sun May 20 19:26:00 2012 is associated with minor number 1011, and so on. In the case that the SVM driver uses a particular minor number after recreating a volume, the modification time stored along with the bitmap in the sample data structure illustrated in FIG. 3D provides a cross reference that preserves the association of the specific bitmap to the originally assigned minor number. During data access, the snapshot program checks the last modification time associated with the bitmap against the last modification time of a volume for which backup is requested. In this way, the proper bitmap may be accessed even if the minor number has been reused by SVM.

Along with deletion or recreation of volumes, the resizing of volumes can also cause inaccuracy of backups in volume-based systems. The SVM driver provides an option to resize a previously created volume. The resizing of a volume may result in increasing or decreasing the size of file system residing on the volume. In some embodiments, the snapshot program provides a mechanism to track the write operations that occur on the changed size file system. The snapshot driver creates a bitmap for the disk and the length of the bitmap is based on the length of the volume. By discovering the length and comparing the length of the bitmap against the length of volume, the snapshot program can track the re-sizing of the volume. Further, re-sizing a volume may also change the modification time of the volume. By comparing the modification time of the volume with the modification time stored in the corresponding bitmap index, a re-sizing condition may be recognized, even if the length of the bitmaps and the length of the volume are the same.

Figure 4:
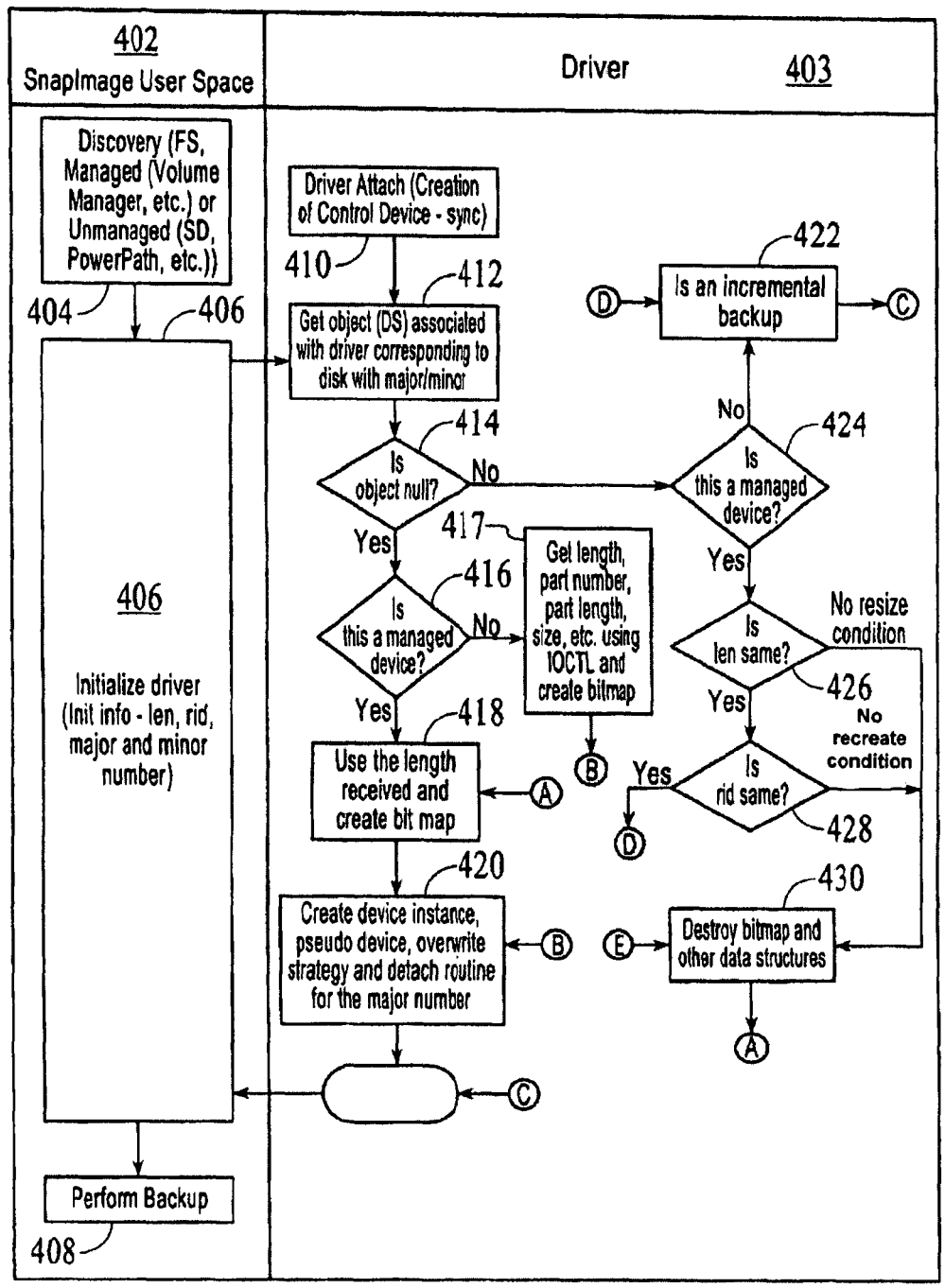
FIG. 4 is a flow diagram illustrating a method for tracking resizing and recreation of volumes using a snapshot program, in accordance with some embodiments.

FIG. 4 is a flow diagram 400 illustrating a method for performing a full backup using a pseudo device, under an embodiment. Flowchart 400 includes two process flows, one for the snapshot user space 402 and one for the driver component 403. The process flow for the snapshot user space 402 begins with a discovery phase 404 in which the file system (FS) and the managed or unmanaged volumes are obtained. The driver is then initialized in block 406. During this initialization phase, the driver is loaded with initialization information including the length of the volume, the record ID and the major and minor number of the volume. The driver then processes this information through its own flow process 403 to perform the backup operation, block 408.

For the embodiment of FIG. 4, the driver flow process 403 begins with a driver attach step 410. Upon initialization 406 of the attached driver by the snapshot user space, the driver gets the object associated with the driver corresponding to the disk identified by the major/minor number pair, block 412. In decision block 414, it is determined whether or not the object is null. If the object is null, the driver next determines if the device is a managed device, block 416. If it is a managed device, the driver uses the length received and creates a bit map, block 418. The driver then creates the device instance, the pseudo device, and overwrites the strategy and detaches the routine for the major number, block 420. At this point, the backup operation can be performed, block 408. In the case that the device is not a managed device, as determined in block 416, the driver gets the length, the part number, the part length, and so on, using an input/output control (IOCTL), which is a system call for device-specific operations and other operations which cannot be expressed by regular system calls, block 417. The process then proceeds from block 420 in which the device instance is created and the backup is performed.

If, in block 414 it is determined that the object is not null, the process again determines if the device is a managed device, block 424. If the object is not null and the device is managed, the backup is deemed to be in incremental backup, block 422, in which case, the backup operation is performed, block 408. If the object is not null and the device is not managed, the driver then checks to see whether the length of the block is the same as shown in decision block 426. If the length is not the same, a resize condition exists in which case the bitmap and other data structures are destroyed, block 430 and the process proceeds from block 418 to create a bitmap using the length received during the initialization phase. If, in block 426 it is determined that the length is the same then the block has not been resized and the driver checks to see whether the record ID number is the same, block 428. If the RID is not the same, then a recreate condition exists in which case the bitmap and other data structures are destroyed, block 430 and the process proceeds from block 418 to create a bitmap using the length received during the initialization phase. If, in block 428 it is determined that the RID is the same, then the driver deems that the operation is an incremental backup and proceeds through block 422 to perform the backup, block 408.

Figure 5:
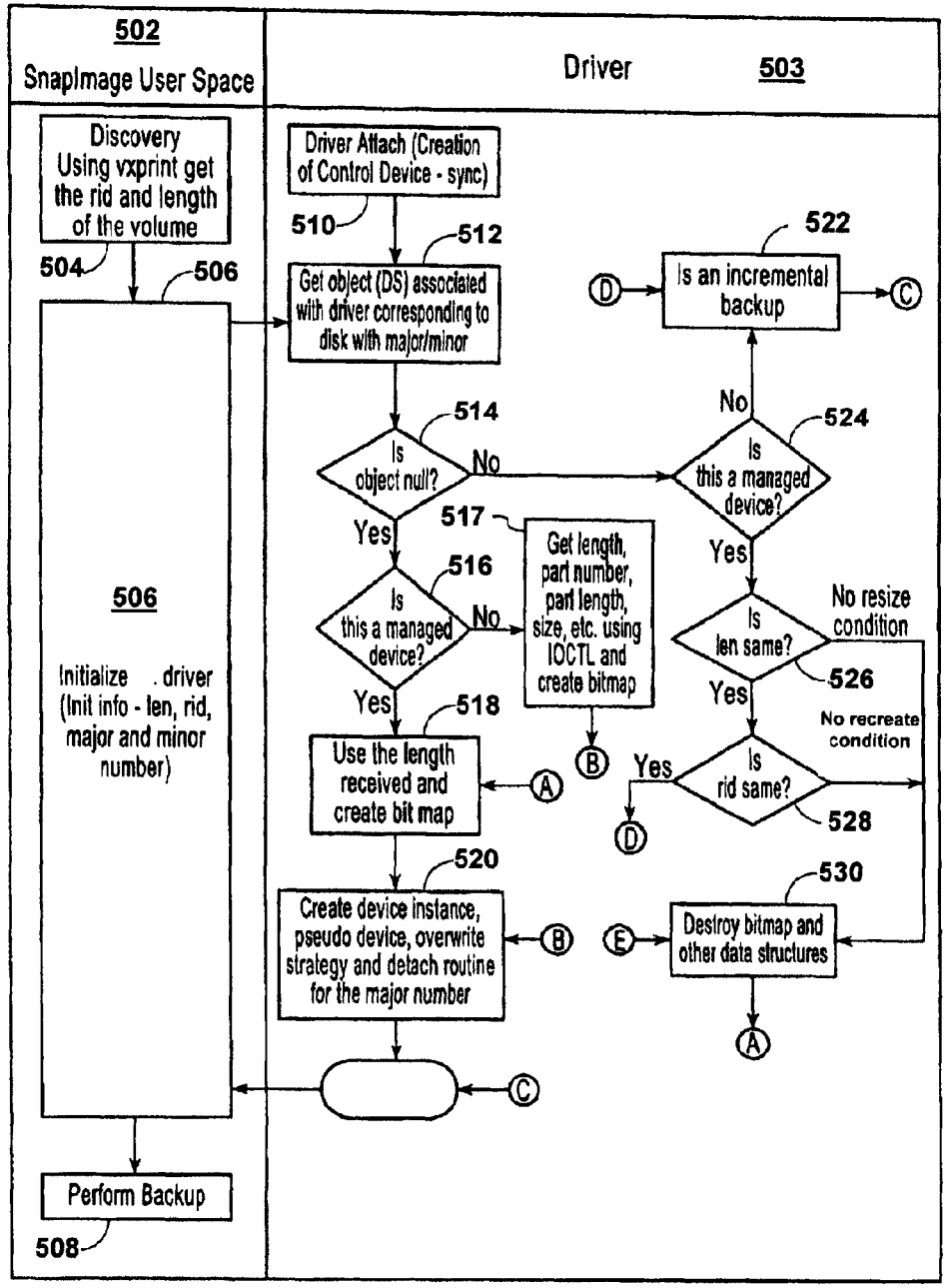
FIG. 5 is a flow diagram illustrating a method for tracking resizing and recreation of volumes using a snapshot program and record ID, in accordance with some embodiments.

FIG. 5 is a flow diagram illustrating a method for tracking resizing and recreation of volumes using a snapshot program, under an embodiment. Flowchart 500 generally illustrates a process of how events are triggered to tracking re-creation and resizing of volumes using record ID and length parameters in a snapshot driver. Flowchart 500 includes two process flows, one for the snapshot user space 502 and one for the driver component 503. The process flow for the snapshot user space 502 begins with a discovery phase 504 in which the record ID and length of the volume are obtained. The driver is then initialized in block 506. During this initialization phase, the driver is loaded with initialization information including the length of the volume, the record ID and the major and minor number of the volume. The driver then processes this information through its own flow process 503 to perform the backup operation, block 508.

For the embodiment of FIG. 5, the driver flow process 503 begins with a driver attach step 510. Upon initialization 506 of the attached driver by the snapshot user space, the driver gets the object associated with the driver corresponding to the disk identified by the major/minor number pair, block 512. In decision block 514, it is determined whether or not the object is null. If the object is null, the driver next determines if the device is a managed device, block 514. If it is a managed device, the driver uses the length received and creates a bit map, block 518. The driver then creates the device instance, the pseudo device, and overwrites the strategy and detaches the routine for the major number, block 520. At this point, the backup operation can be performed, block 508. In the case that the device is not a managed device, as determined in block 516, the driver gets the length, the part number, the part length, and so on, using an input/output control (IOCTL), which is a system call for device-specific operations and other operations which cannot be expressed by regular system calls, block 517. The process then proceeds from block 520 in which the device instance is created and the backup is performed.

If, in block 514 it is determined that the object is not null, the process again determines if the device is a managed device, block 524. If the object is not null and the device is managed, the backup is deemed to be in incremental backup, win which case, the backup operation is performed, block 508. If the object is not null and the device is managed, the driver then checks to see whether the length of the block is the same as shown in decision block 526. If the length is not the same, a resize condition exists in which case the bitmap and other data structures are destroyed, block 530 and the process proceeds from block 518 to create a bitmap using the length received during the initialization phase. If, in block 526 it is determined that the length is the same then the block has not been resized and the driver checks to see whether the record ID number is the same, block 528. If the RID is not the same, then a recreate condition exists in which case the bitmap and other data structures are destroyed, block 530 and the process proceeds from block 518 to create a bitmap using the length received during the initialization phase. If, in block 528 it is determined that the RID is the same, then the driver deems that the operation is an incremental backup and proceeds through block 522 to perform the backup, block 508.

In an embodiment, the record ID number is created automatically by the VxVM driver and is provided to the snapshot user space 502 through the discovery phase 504. This RID number is then passed to the driver through the get object process of block 512. Alternatively, the RID number may be a timestamp or counter value that is created by a separate process and not by the volume manager itself. In this case, it is generated and stored by this process and provided to the driver during the discovery and initialization phases.

Figure 6:
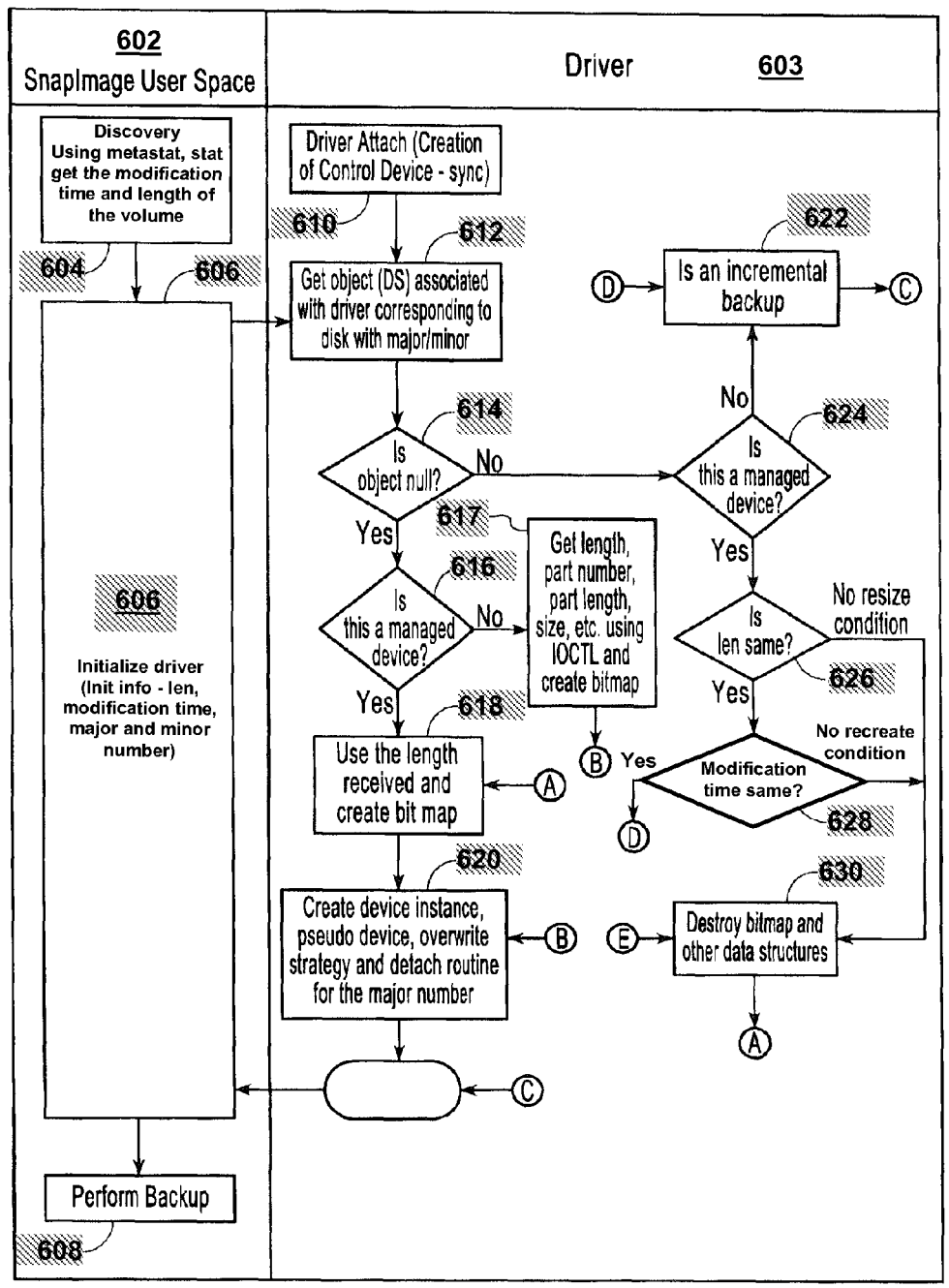
FIG. 6 is a flow diagram illustrating a method for tracking resizing and recreation of volumes using a snapshot program and modification time, in accordance with some embodiments.

FIG. 6 is a flow diagram illustrating a method for tracking resizing and recreation of volumes using modification time during a backup, in accordance with some embodiments. Flowchart 600 generally illustrates a process of how events are triggered to tracking re-creation and resizing of volumes using last modification time and length parameters in a snapshot driver. Flowchart 600 includes two process flows, one for the snapshot user space 602 and one for the driver component 603. The process flow for the snapshot user space 602 begins with a discovery phase 604 in which the last modification time and the volume length are obtained. In some embodiments, the last modification time associated with the volume may be obtained, for example, using UNIX stat or fstat system call. The volume length may be obtained, for example, using metastat system command. The driver is then initialized in block 606. During this initialization phase, the driver is loaded with initialization information including the length of the volume, the last modification time and the major and minor number of the volume. The driver then processes and stores this information through its own flow process 603 to perform the backup operation, block 608.

For the embodiments of FIG. 6, the driver flow process 603 begins with a driver attach step 610. Synchronization may also be taken in step 610 to write all the data in memory of the user space to the disk. Upon initialization 606 of the attached driver by the snapshot user space 602, the driver gets the object associated with the driver. The object is an instance with structure as illustrated in FIG. 3D. The object may be identified by the major/minor number pair, may contain other information such as modification or other identifiers to cross reference a bitmap representing a volume pseudo device, block 612. In decision block 614, it is determined whether or not the object is null. A not-null object may indicate that a full backup has been performed on the volume before. During a full backup, a bitmap index with an exemplary structure as illustrated in FIG. 3D may have been created for the volume.

If the object is null, the driver next determines if the device is a managed device, block 616. A managed device may be a device such as a volume created by a volume manager, as illustrated in FIG. 3A and FIG. 3B. If it is a managed device, the driver uses the length received, creates a bitmap, and stores the length along with the bitmap in a data structure illustrated in FIG. 3D, block 618. The driver then creates the device instance, the pseudo device, and overwrites the strategy and detaches the routine for the major number, block 620. At this point, the backup operation can be performed, block 608. In the case that the device is not a managed device, as determined in block 616, the driver gets the length, the partition number, the partition length, and so on, using an input/output control (IOCTL), which is a system call for device-specific operations and other operations which cannot be expressed by regular system calls, block 617. The process then proceeds from block 620 in which the device instance is created and the backup is performed.

If, in block 614 it is determined that the object is not null, the process again determines if the device is a managed device, block 624. An indication of the object not-null is that a full backup may have been performed on the device before. If a device is not a managed device, then re-using the minor number problem may not be an issue for the backup. In such case, when the object is not null and the device is not managed, the backup is deemed to be in incremental backup, block 622, in which case, an incremental backup operation is performed, block 608. If the object is not null and the device is managed, then re-using the minor number may be problematic as stated above. To deal with the minor number re-using issue, driver may then proceed to block 626 to check whether the length of the volume is the same as the length stored along with bitmap in the object. If the length is not the same, a resize condition exists in which case the bitmap and other data structures are destroyed, block 630 and the process proceeds from block 618 to create a bitmap using the length received during the initialization phase. If, in block 626 it is determined that the volume length is the same as the length stored along with the bitmap in the object, then the volume has not been resized and the driver checks to see whether the modification time is the same, block 628. If the last modification time of the volume is not the same as the modification time stored along with the bitmap in the object, then a recreate condition exists in which case the bitmap and other data structures are destroyed, block 630 and the process proceeds from block 618 to create a bitmap using the length received during the initialization phase. If, in block 628 it is determined that the last modification time of the volume is the same as the modification time stored along with the bitmap in the object, then the driver deems that the operation is an incremental backup and proceeds through block 622 to perform the backup, block 608.

Figure 7:
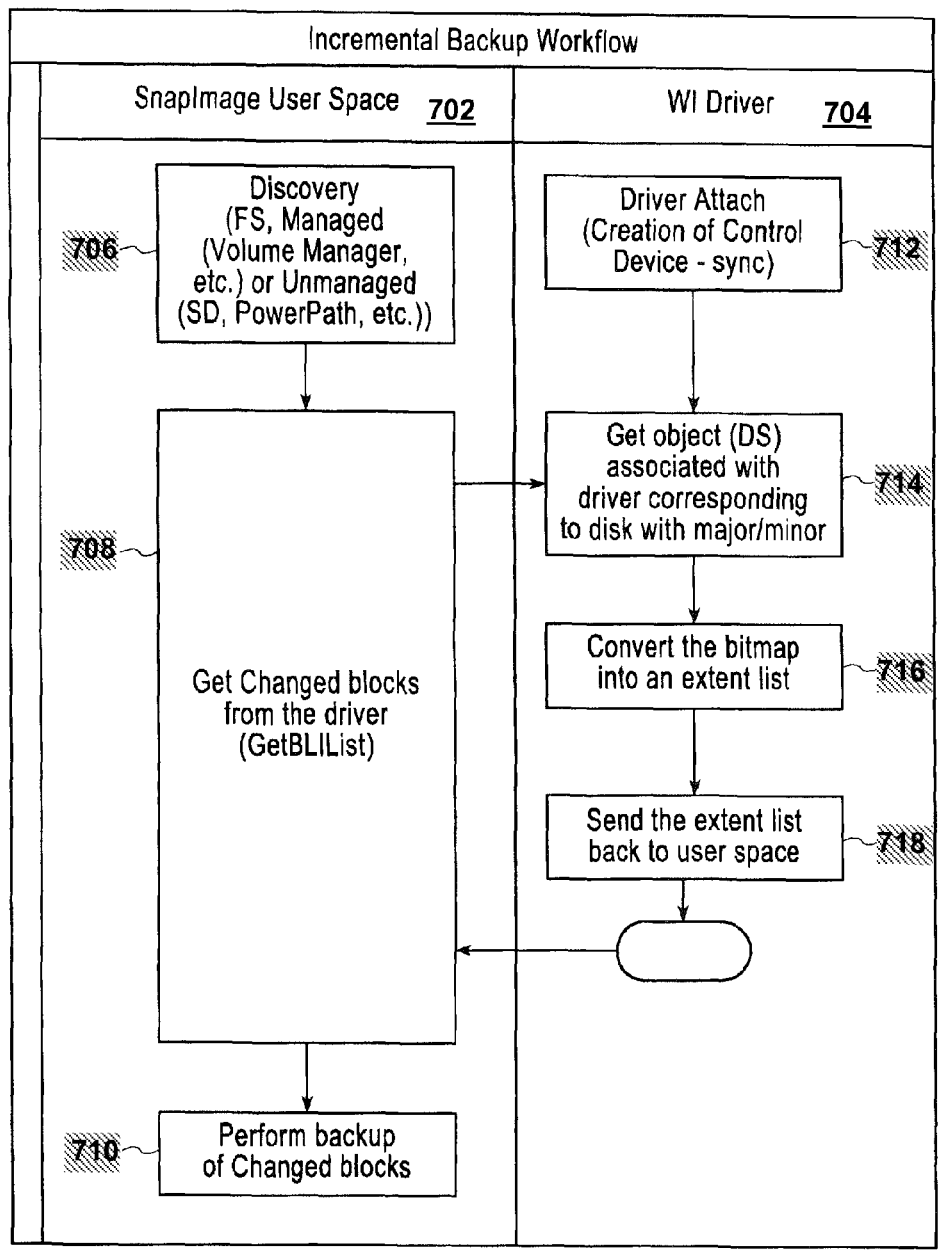
FIG. 7 is a flow diagram illustrating a method of performing an incremental backup using a snapshot program according to some embodiments.

FIG. 7 is a flow diagram illustrating a method of performing an incremental backup using a snapshot program according to embodiments. Flowchart 700 includes two process flows, one for the snapshot user space 702 and one for the driver component 704. The process flow for the snapshot user space 702 begins with a discovery phase 706 in which the file system (FS), volume manager (VM) or unmanaged resources are discovered. The changed blocks from the driver are obtained in block 708 through operations performed by the driver in driver flow 704. After the changed blocks are obtained, the snapshot process performs the incremental backup by backing up the changed blocks, block 710.

For the embodiment of FIG. 7, the driver flow process 704 begins with a driver attach step 712. Upon initialization of the attached driver by the snapshot user space, the driver gets the object associated with the driver corresponding to the disk identified by the major/minor number pair, block 714. The driver then converts the obtained bitmap into an extent list, block 714. The extent list is then transmitted back to the user space 702, as shown in block 718, and the incremental backup based on the changed blocks is then performed, block 710.

The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

Preferred embodiments are described herein, including the best mode known to the inventor for carrying out the claimed subject matter. Of course, variations of those preferred embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

For the sake of clarity, the processes and methods herein have been illustrated with a specific flow, but it should be understood that other sequences may be possible and that some may be performed in parallel, without departing from the spirit of the invention. Additionally, steps may be subdivided or combined. As disclosed herein, software written in accordance with the present invention may be stored in some form of computer-readable medium, such as memory or CD-ROM, or transmitted over a network, and executed by a processor.

All references cited herein are intended to be incorporated by reference. Although the present invention has been described above in terms of specific embodiments, it is anticipated that alterations and modifications to this invention will no doubt become apparent to those skilled in the art and may be practiced within the scope and equivalents of the appended claims. More than one computer may be used, such as by using multiple computers in a parallel or load-sharing arrangement or distributing tasks across multiple computers such that, as a whole, they perform the functions of the components identified herein; i.e. they take the place of a single computer. Various functions described above may be performed by a single process or groups of processes, on a single computer or distributed over several computers. Processes may invoke other processes to handle certain tasks. A single storage device may be used, or several may be used to take the place of a single storage device. The present embodiments are to be considered as illustrative and not restrictive, and the invention is not to be limited to the details given herein. It is therefore intended that the disclosure and following claims be interpreted as covering all such alterations and modifications as fall within the true spirit and scope of the invention.

What is claimed is:

1. A method comprising:
   obtaining a minor number for each volume of a storage element to be backed up in a snapshot file system, the minor number referencing a respective bitmap, wherein the minor number is reusable for a different volume, and wherein the bitmap contains a pattern indicating blocks backed up in the snapshot file system;
   writing a record associated with each respective bitmap that associates a modification time of a volume with the respective bitmap referenced by the minor number such that the record preserves an association of the respective bitmap with the minor number when the minor number corresponding to the volume subsequently changes;
   obtaining a length for each volume to be backed up, wherein at least one of the obtaining the minor number, the associating, and the obtaining the length are executed by one or more processors;
   obtaining an object corresponding to a volume associated with a first minor number;
   comparing a length of the volume referenced by the first minor number with a length of a corresponding bitmap of the volume referenced by the first minor number;
   performing an incremental backup operation if the length of the volume referenced by the first minor number matches the length of the corresponding bitmap; and
   creating a new bitmap for the volume if the length of the volume referenced by the first minor number does not match the length of the corresponding bitmap.

2. The method of claim 1 wherein the modification time is obtained by a stat system call.

3. The method of claim 1 wherein the modification time is obtained by an fstat system call.

4. The method of claim 1 wherein the minor number is assigned by a volume manager program implementing the snapshot file system.

5. The method of claim 4, wherein the obtaining an object is performed in a driver operating with the volume manager program, the method further comprising:

comparing a modification time for the volume associated with the first minor number with a modification time for the corresponding bitmap;

performing an incremental backup operation if the modification time for the volume matches the modification time for the corresponding bitmap; and creating a new bitmap for the volume as recreated by the volume manager program if the modification time for the volume does not match the modification time for the corresponding bitmap.

6. The method of claim 1 wherein the new bitmap is for the volume as recreated by the volume manager program.

7. The method of claim 6 wherein the volume corresponds to a managed device, and wherein the new bitmap is created using a length received in a driver initialization phase initiated by a user space backup application of the snapshot file system.

8. The method of claim 6 wherein the volume corresponds to a non-managed device, and wherein the new bitmap is created using an input/output control process.

9. The method of claim 4 wherein a first minor number referencing a first bitmap is similar to a second minor number referencing a second bitmap, wherein the second bitmap is different from the first bitmap.

10. A computer program product, comprising a non-transitory computer-readable medium having a computer-readable program code embodied therein, the computer-readable program code adapted to be executed by one or more processors to implement a method comprising:

obtaining a minor number for each volume of a storage element to be backed up in a snapshot file system, the minor number referencing a respective bitmap, wherein the minor number is reusable for a different volume, and wherein the bitmap contains a pattern indicating blocks backed up on the snapshot file system;

writing a record associated with each respective bitmap that associates a modification time of a volume with the respective bitmap referenced by the minor number such that the record preserves an association of the respective bitmap with the minor number when the minor number corresponding to the volume subsequently changes; and obtaining a length for each volume to be backed up;

obtaining an object corresponding to a volume associated with a first minor number;

comparing a length of the volume referenced by the first minor number with a length of a corresponding bitmap of the volume referenced by the first minor number;

performing an incremental backup operation if the length of the volume referenced by the first minor number matches the length of the corresponding bitmap; and creating a new bitmap for the volume if the length of the volume referenced by the first minor number does not match the length of the corresponding bitmap.

11. The computer program product of claim 10 wherein the modification time is obtained by one of: a system command, and a system call.

12. The computer program product of claim 10 wherein the minor number is assigned by a volume manager program implementing the snapshot file system, wherein a first minor number referencing a first bitmap is similar to a second minor number referencing a second bitmap, wherein the second bitmap is different from the first bitmap.

13. The computer program product of claim 10, wherein the obtaining an object is performed in a driver operating with the volume manager program, wherein the computer-readable program code is further adapted to implement a method comprising:

comparing a modification time associated with the first minor number with a modification time for the corresponding bitmap;

performing an incremental backup operation if the modification time for the first minor number matches the modification time for the corresponding bitmap; and creating a new bitmap for the volume as recreated by the volume manager program if the modification time for the first minor number does not match the modification time for the corresponding bitmap.

14. The computer program product of claim 10 wherein the new bitmap is for the volume as recreated by the volume manager program.

15. The computer program product of claim 14 wherein the volume corresponds to a managed device, and wherein the new bitmap is created using a length received in a driver initialization phase initiated by a user space backup application of the snapshot file system.

16. The computer program product of claim 14 wherein the volume corresponds to a non-managed device, and wherein the new bitmap is created using an input/output control process.

17. A system comprising:

a processor-based application executed on a computer and configured to:

obtain a minor number for each volume of a storage element to be backed up in a snapshot file system, the minor number referencing a respective bitmap, wherein the minor number is reusable for a different volume, and wherein the bitmap contains a pattern indicating blocks backed up on the snapshot file system;

write a record associated with each respective bitmap that associates a modification time of each volume with the respective bitmap referenced by the minor number such that the record preserves an association of the respective bitmap with the minor number when the minor number corresponding to the volume subsequently changes;

obtain a length for each volume to be backed up;

obtain an object corresponding to a volume associated with a first minor number;

compare a length of the volume referenced by the first minor number with a length of a corresponding bitmap of the volume referenced by the first minor number;

perform an incremental backup operation if the length of the volume referenced by the first minor number matches the length of the corresponding bitmap; and create a new bitmap for the volume if the length of the volume referenced by the first minor number does not match the length of the corresponding bitmap.

18. The system of claim 17 wherein the modification time is obtained by one of: a system command, and a system call, and wherein a first minor number referencing a first bitmap is similar to a second minor number referencing a second bitmap, wherein the second bitmap is different from the first bitmap.

19. The system of claim 17 wherein the processor-based application is further configured to:

compare a modification time for the first minor number with a modification time for the corresponding bitmap; and perform an incremental backup operation if the modification time for the first minor number matches the modification time for the corresponding bitmap, or create a new bitmap for the volume as recreated by the volume manager program if the modification time for the first minor number does not match the modification time for the corresponding bitmap.

20. The system of claim 19 wherein the new bitmap is for the volume as recreated by the volume manager product.

* * * * *